US012784474B2

(12) United States Patent
Taormina et al.

(10) Patent No.: US 12,784,474 B2
(45) **Date of Patent: *Nov. 3, 2026**

(54) DEBRIS DETECTION SYSTEM AND METHOD

(71) Applicant: Rota Technologies LLC, Clinton Township, MI (US)

(72) Inventors: Roberto Taormina, Clinton Township, MI (US); Adam Staber, Livonia, MI (US)

(73) Assignee: Rota Technologies LLC, Clinton Township, MI (US)

( * ) Notice: Subject to any disclaimer, the term of this patent is extended or adjusted under 35 U.S.C. 154(b) by 820 days.

This patent is subject to a terminal disclaimer.

(21) Appl. No.: 17/158,998

(22) Filed: Jan. 26, 2021

(65) Prior Publication Data

US 2021/0166059 A1 Jun. 3, 2021

Related U.S. Application Data

(63) Continuation of application No. 15/928,704, filed on Mar. 22, 2018, now Pat. No. 10,902,281.

(51) Int. Cl.

| | |
|---|---|
| ***H04N 7/18*** | (2006.01) |
| ***G06F 18/00*** | (2023.01) |
| ***G06V 10/147*** | (2022.01) |
| ***G06V 20/00*** | (2022.01) |

(52) U.S. Cl.

CPC ............ *H04N 7/188* (2013.01); *G06F 18/00* (2023.01); *G06V 10/147* (2022.01); *G06V 20/00* (2022.01); *H04N 7/181* (2013.01)

(58) Field of Classification Search

CPC ............ H04N 7/18; H04N 7/181; H04N 9/47; G06K 9/62

USPC ................................ 348/86, 89, 91, 92, 159

See application file for complete search history.

(56) References Cited

U.S. PATENT DOCUMENTS

| | | | | |
|---|---|---|---|---|
| 4,805,778 | A | 2/1989 | Nambu | |
| 4,884,696 | A * | 12/1989 | Peleg | B07C 5/00 209/912 |
| 5,085,325 | A * | 2/1992 | Jones | B07C 5/3422 209/939 |
| 5,277,320 | A | 1/1994 | Corkill et al. | |
| 6,430,903 | B1 * | 8/2002 | Christiansen | A01D 75/187 56/10.2 J |
| 6,433,293 | B1 | 8/2002 | Bollinger et al. | |
| 6,535,637 | B1 | 3/2003 | Wootton | |

(Continued)

*Primary Examiner* — Trang U Tran

(74) *Attorney, Agent, or Firm* — Dean W. Amburn

(57) ABSTRACT

A conveyor debris detection system and method detects foreign objects on a conveyor based on size or matching a preset image stored in a database. Non-debris objects such as eggs are filtered out by color. The debris detection system includes a frame and housing for placement above the conveyor, a lighting unit attached to the frame for illuminating the conveyor below the frame, and a camera attached to the frame for capturing images of the objects moving along the conveyor wherein the images are captured at preset time intervals. A processor unit receives the images and identifies the foreign objects and initiates a debris signal when foreign objects are identified. An alarm sounds when foreign objects are detected so that the foreign objects can be removed to prevent damage or contamination from the foreign objects.

6 Claims, 5 Drawing Sheets

(56) References Cited

U.S. PATENT DOCUMENTS

| | | | | |
|---|---|---|---|---|
| 6,888,082 | B1 * | 5/2005 | Blanc .................. | G01B 11/024 209/939 |
| 7,474,392 | B2 | 1/2009 | Van Soest | |
| 8,292,340 | B2 | 10/2012 | Hebrank | |
| 8,330,809 | B2 | 12/2012 | Thomas et al. | |
| 9,000,319 | B2 | 4/2015 | Deefholts | |
| 9,035,210 | B1 | 5/2015 | Davis | |
| 10,143,185 | B2 | 12/2018 | Phelps | |
| 2012/0263310 | A1 * | 10/2012 | Fournel .................. | A63F 13/63 381/61 |
| 2015/0224544 | A1 | 8/2015 | McGloughlin et al. | |
| 2015/0283586 | A1 | 10/2015 | Dante et al. | |

* cited by examiner

DEBRIS DETECTION SYSTEM AND METHOD

CROSS-REFERENCE TO RELATED APPLICATION

This application is a continuation of U.S. patent application Ser. No. 15/928,704 filed on Mar. 22, 2018, now U.S. Pat. No. 10,902,281, the entire disclosure of which is hereby incorporated by reference.

BACKGROUND

1. Field of the Invention

The invention generally relates to imaging objects on a conveyor transport system, and identifying foreign items to signal an alarm in order to have the foreign items removed. More particularly, the invention relates to a debris detection system and method used with existing conveyors in egg production systems having a flat, continuous process and adapted to be placed over the existing conveyors without interruption of the flow process.

2. Description of the Related Art

The largest poultry farms in the U.S. produce 750 billion eggs per year. To produce, grade, wash, and package that amount of eggs requires a significant amount of investment in the machinery. Egg production stoppage due to machine breakdown is a key concern and significant monetary loss to the poultry farm owner-operator. Obvious issues are employee down time, backlog of egg processing and packaging, and delivery truck backup at loading docks. The other concern is the time and money required to find and transport an experienced technician, including the shipment of parts, out to a farm in a remote area of the country. The breakdown of egg processing machinery might cause the farm to be down for multiple days which will result in significant losses. If the farm is unable to process the chicken eggs in a timely manner, large quantities of eggs accumulate in the chicken houses and on the conveyor belts, which ultimately cause eggs to be damaged preventing them from being sold for human consumption.

One major cause of egg processing equipment breakdown is foreign objects and/or debris on an egg conveyor leading into an egg grading machine. Current means of keeping foreign debris from disrupting egg production requires human visual detection coupled with the requisite removal action. With transport systems moving eggs through the line at a speed of 0.01 mph up to 35 mph, this becomes difficult and prone to compromise.

There are egg quality detection systems in the prior art, such as U.S. Pat. No. 5,277,320 in the name of Corkill et al., U.S. Pat. No. 6,433,293 in the name of Bollinger et al. and U.S. Pat. No. 7,474,392 in the name of Van Soest. However, these systems merely look at the quality of the egg and types.

There are also sorting systems for detecting debris in a falling flow of food items, such as in U.S. Pat. No. 9,000,319 in the name of Deefholts, United States Patent Application Publication No. 2015/0224544 in the name of McGloughlin et al. and Unites States Patent Application Publication No. 2015/0283586 in the name of Dante et al. These systems are integrally inserted within a system and sort during falling of the food items.

SUMMARY OF THE INVENTION

The conveyor debris detection system and method detects objects including foreign objects and preset objects moving along a conveyor. The conveyor debris detection system includes a frame for placement above the conveyor, a lighting unit attached to the frame for illuminating the conveyor below the frame, a camera attached to the frame for capturing images of the objects moving along the conveyor wherein the images are captured at preset time intervals. A processor unit receives the images and distinguishes the objects as either foreign objects or preset objects and the processor initiates a debris signal when foreign objects are identified. An alarm system sounds an alarm when foreign objects are detected.

If foreign materials are detected, the operator will be notified before the foreign material becomes lodged in the machines internal components and causes damage. As a result, breakdown of egg processing machinery is minimized, saving the poultry farmer substantial downtime and money. In addition, the unit will also prevent foreign material, such as chicken body parts and manure from going into the wash-water in the egg washing machines used to clean the eggs.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE DRAWINGS

Figure 1:
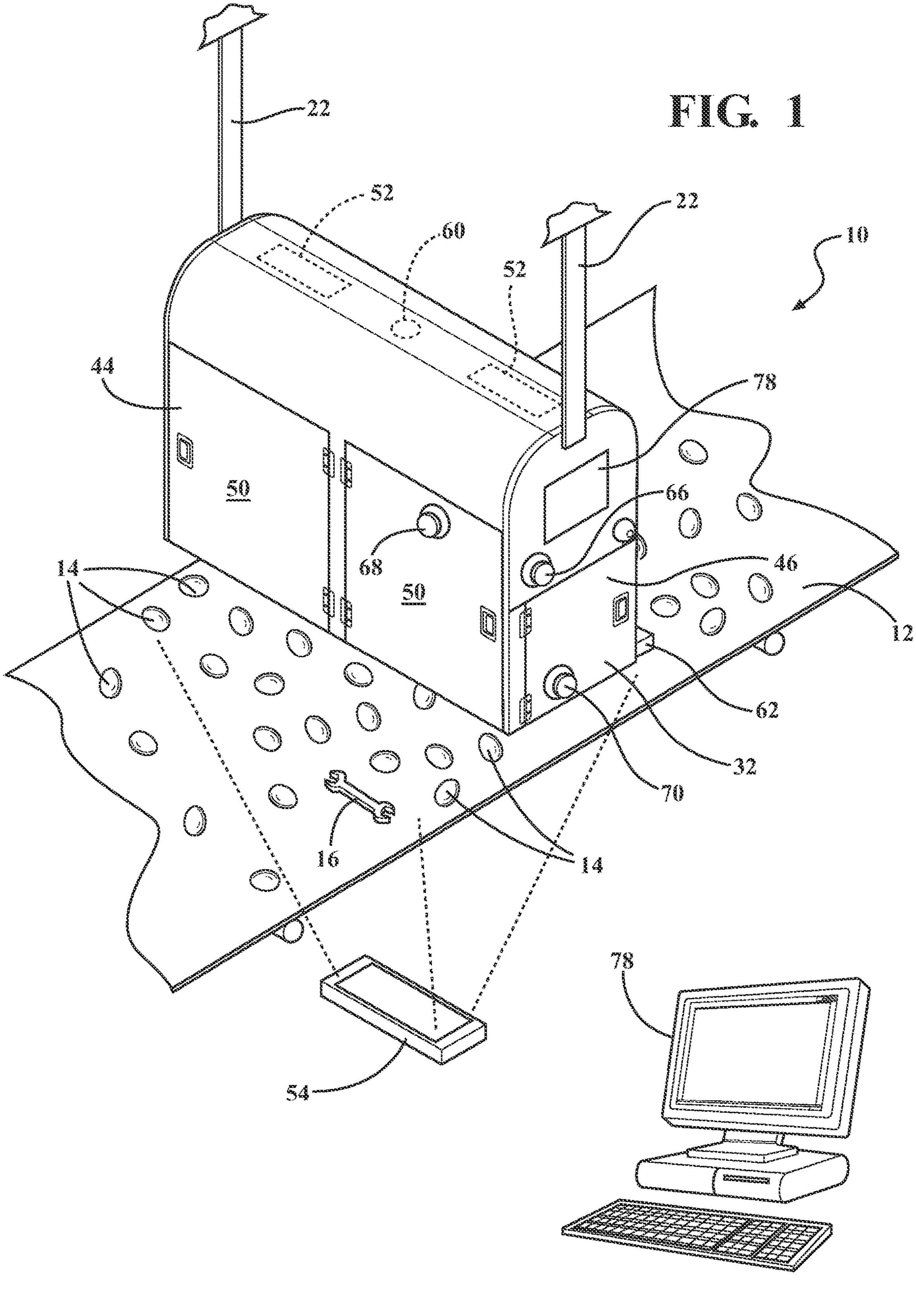
FIG. 1 is a perspective view of the debris detection system.

FIG. 1 illustrates a debris detection system 10 for use with a conveyor 12 during an egg production process. The conveyor 12 transports eggs 14 in a horizontal motion moving along a flat surface. The debris detection system 10 can be used in conjunction with any type of egg conveyor 12 such as a conveyor belt, or may include any other type of horizontal moving transport system for the eggs, including rollers or spool bars, flat plastic belts available from intralox®, rod conveyors, etc. Though the invention is described as it relates to egg production, the system 10 may also be used in other industrial, agricultural production environments where foreign object detection is necessary.

Conveyor 12 continuously moves through different stations from production of the egg to packaging of the egg, including in between an egg grading machine, washing machine, etc., without stopping. The debris detection system 10 may be placed anywhere along the conveyor 12 to detect and signal when a foreign object 16 is found as different from a preset object 14, namely an egg, and requires removal. Typically, the debris detection system 10 will be placed before the egg washing machine and before the egg grading machine, or it may be placed over the egg grading machine.

Figure 2:
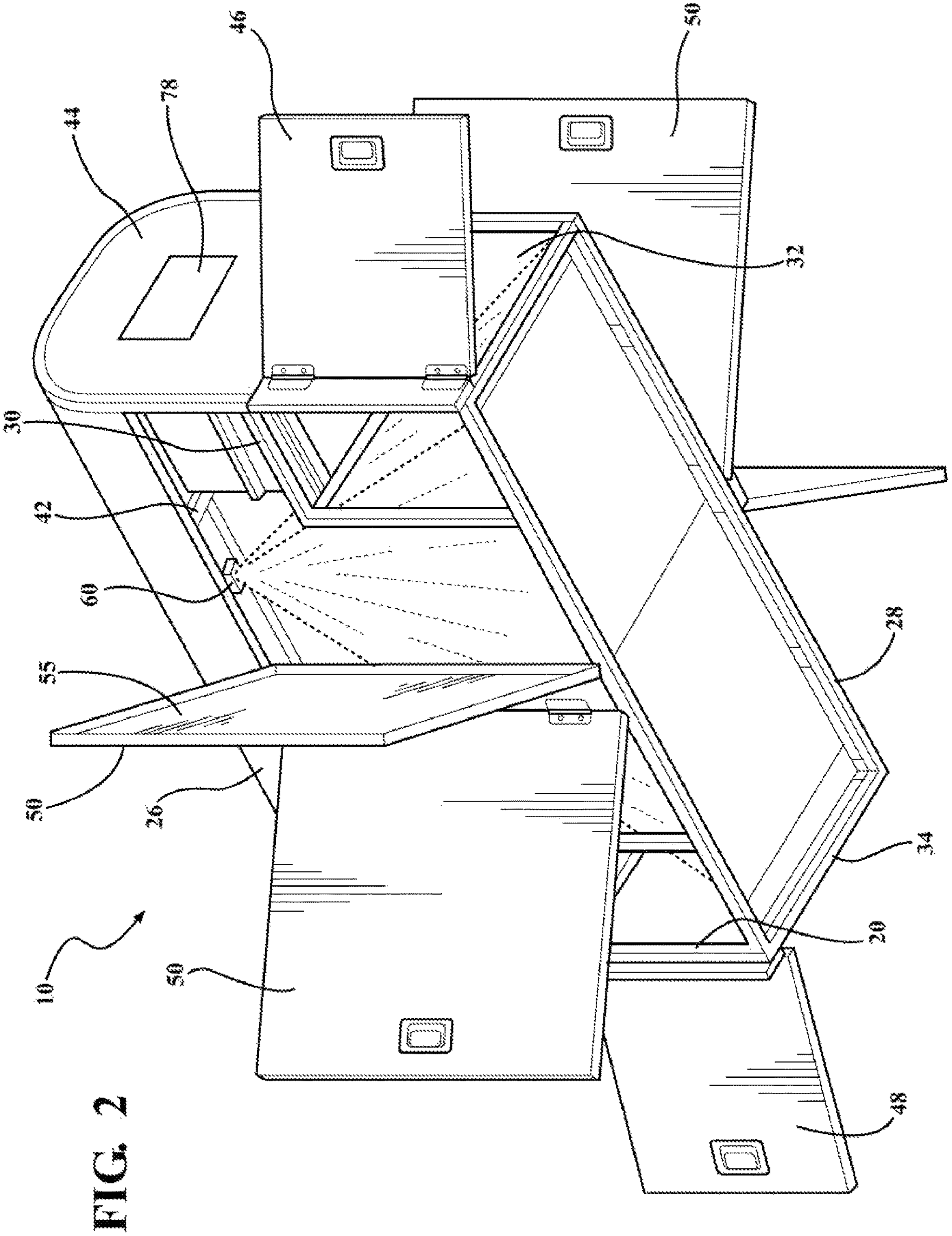
FIG. 2 is a perspective view of the frame of the system.

As best illustrated in FIG. 2, the debris detection system 10 includes a frame 20 for placement above the egg conveyor or transport system 12. The majority of conveyors 12 used in egg production are white or off-white in color. The debris detection system 10, and more particularly the frame

20, may be suspended from the ceiling, bolted to other egg related machinery, bolted to the transport frame, or it may sit on a stand so that the bottom of the debris detection system 10 sits with a minimum clearance of one inch to a maximum of 75 feet above the conveyor or transport system. FIG. 1 illustrates the debris detection system 10 suspended from the ceiling by mounting supports 22.

Figure 3:
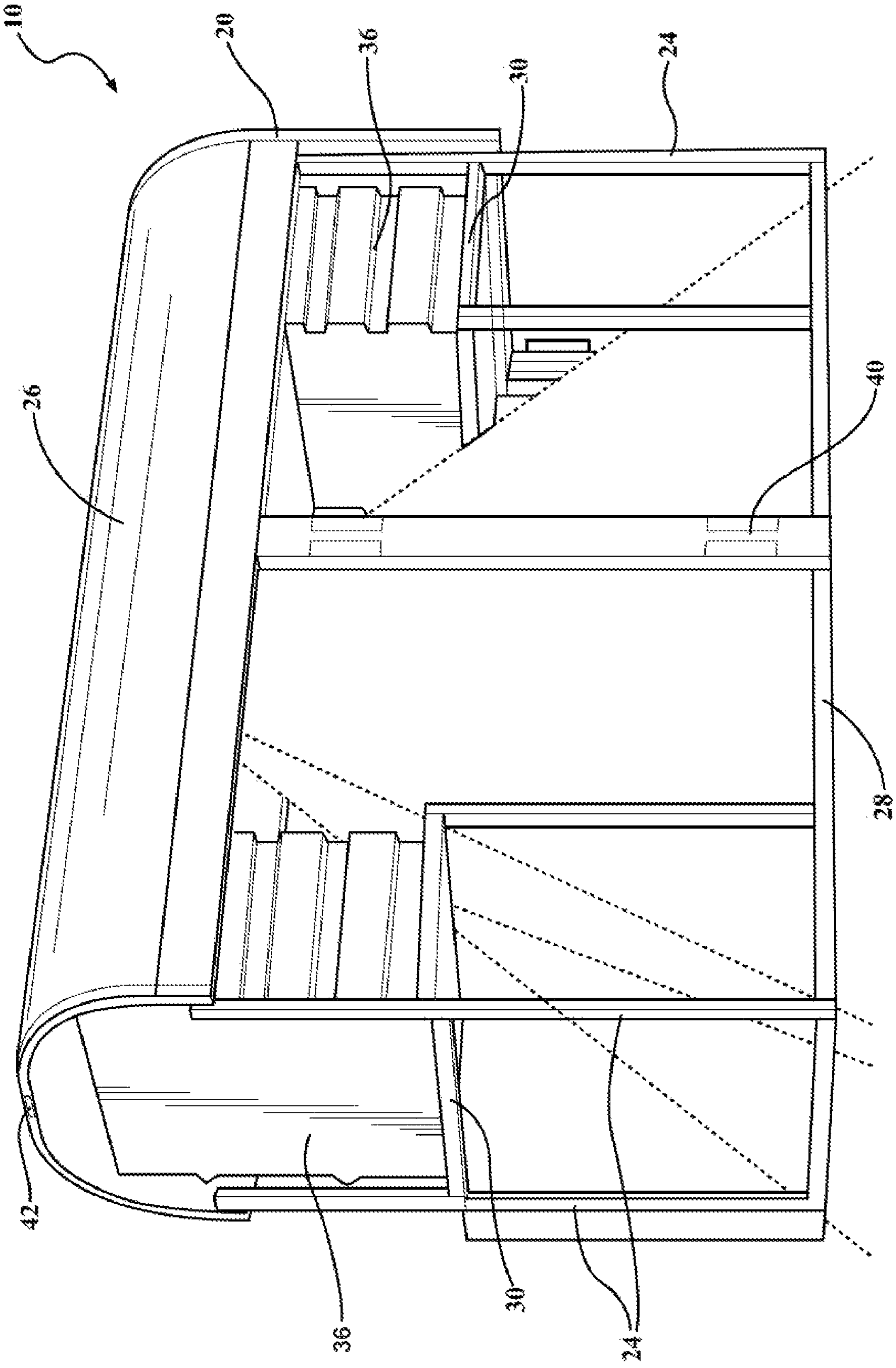
FIG. 3 is a perspective bottom view of the debris detection system.
Figure 4:
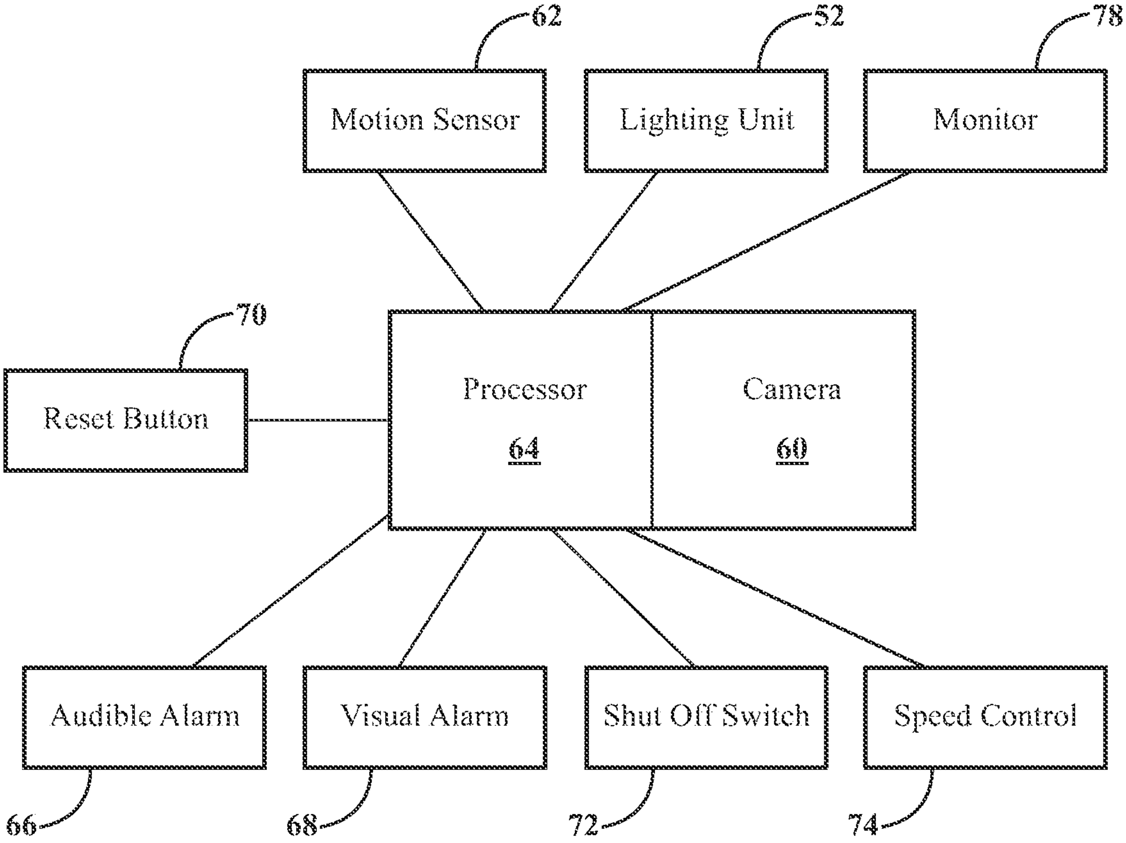
FIG. 4 illustrates a simplified schematic of the system.

The frame 20 includes a plurality of corner supports 24 supporting an arcuate roof 26. A base frame member 28 is fixed to the lower ends of the corner supports 24 to support the assembly 20 and provide an open bottom for debris detection therethrough. Shelf supports 30 are established at front 32 and rear 34 ends. The shelf supports 30 provide support for electronic housings 36 thereon for containing the electronic components of the system 10. Center side frame supports 40 provide further structural stability and support. The frame 20 includes a central mounting bar 42, best illustrated in FIG. 3, positioned along an interior of the roof 26 and on the inside of the system 10 for supporting electronics as subsequently discussed.

The debris detection system 10 includes a housing 44 for covering the frame 20. The housing 44 is supported by the frame 20 and includes a plurality of access doors 46-50 on the front, back and sides for access therein. The housing 44 protects the components secured on the frame 20 and allows a self-contained unit that can be adapted and placed over any egg conveyor 12. Typically, the housing 44 may be formed from stainless steel sheeting or other suitable material for the egg processing environment.

A lighting unit 52 illuminates the conveyor 12 within a detection area. The lighting unit 52 is attached to the central mounting bar 42 and may include a dedicated LED panel and LED drivers to evenly illuminate the eggs 14 and detection area. The dedicated LED panel 52 is focused downward onto the oncoming eggs 14. Light intensities are typically set from 100 to 10000 lumens and a color temperature of from 1000K to 10,000K depending on analysis parameters and for eliminating shadows. The lighting unit 52 may include multiple LED panels as necessary to illuminate the detection area, and two panels 52 illustrated in FIG. 1. Depending on the conveyor 12, an optional lower light panel 54 may be installed underneath the conveyor 12 as a backlight for detection and include a 300×1500 mm 6000K LED light. Alternatively, a white or off-white backdrop (not shown) can be placed under the conveyor 12 when the conveyor 12 consists of rollers and not a continuous loop belt. To further eliminate false positive signals due to shadows, flat, wide light panels 55 are secured to each of the access doors 46-50 (one flat, wide light panel 55 shown in FIG. 3). The flat, wide light panels 55 may be parallel to the access doors 46-50 or they may be tilted inwardly such that the light emitted by the flat, wide light panels 55 are generally directed downwardly. In one embodiment, the flat, wide light panels 55 are tilted inwardly and downwardly at 15° with respect to a bottom edge of each of the flat, wide light panels 55 that are either secured to an inner surface of an access door 46-50 or disposed immediately adjacent thereto.

A camera 60 is attached to the central mounting bar 42 of the frame 20 for capturing images of objects moving along the conveyor 12. The images are captured at preset time intervals. Multiple cameras 60 may be used to inspect the detection area typically equal to the width of the conveyor 12. The Figures illustrate the use of a single camera 60 centrally located along the mounting bar 42 and the fan pattern extending from the camera 60 represents the detection area. The camera 60 is typically a color camera with suitable speed and resolution to capture RAW images from 11 to 120 frames per second depending on the inspection application. The camera 60 can be set to capture images at one per second intervals without stopping the conveyor 12. However, it is within the scope of the invention to use other sampling rates depending on conveyor speed, etc. The detection area is typically the entire cross section of the conveyor 12 located below the assembly, commonly a two-foot by six-foot (2 ft.×6 ft.) area.

A motion sensor 62 is directed toward the conveyor 12, typically by means of a proximity switch, photo-eye or encoder, or other motion detecting device, to send an enable signal when the conveyor 12 starts motion to trigger the camera 60 to initiate image capture.

A processor unit 64 receives the images from the camera 60 and distinguishes the objects as either foreign matter 16 or acceptable matter 14, e.g., eggs. The processor unit 64 is programmed to identify the color of the conveyor 12 and the color of the eggs 14. The processor unit 64 is programmed to identify numerous different shades of color. The processor unit 64 is then able to filter the conveyor 12 and the eggs 14 out of any images captured by the camera 60. And all that remains will include conveyor seams (none shown) and debris. The processor unit 64 can be programmed to ignore the conveyor seams and small specs of debris, with the remainder of the objects being identified as being debris that needs to be removed from the conveyor 12.

The processor unit 64 may be integrally part of the camera 60 or separate therefrom. The processor unit 64 initiates a warning and debris signal when foreign objects 16 are identified above a predetermined magnitude. A small size or types of debris such as feathers or smaller debris may be considered acceptable matter wherein no debris signal will be initiated since smaller size debris will not cause damage to equipment.

The warning signal is received by an audible alarm 66 to provide audible indication of the sensed foreign object 16. The debris signal is received by visual alarm 68 to also notify the operator to remove the debris, such visual alarm typically being a warning light that may have different wavelength outputs depending on the severity of the alarm. A reset button 70 sends a reset signal upon activation thereof by an operator and is connected to the processor unit 64 to reset the alarms 66, 68 when activated by the operator. If the operator does not remove the debris and push the reset button 70 within an adjustable time frame, typically 15-60 seconds, the processor unit 64 will send a shutoff signal to a shutoff switch 72 which will stop the conveyor 12. The system 10 also includes a speed control switch 74 which is connected between the processor unit 64 and conveyor controller to slow the conveyor 12 during the time delay if the reset button 70 is not activated.

The processor unit 64 processes the captured images at high speed and translates the data into inspection events. The processor unit 64 uses software having computer vision and object recognition algorithms known to those skilled in the art that learn and match patterns in the pixels using appearance based or feature based techniques. Images are processed in milliseconds, and inspection events are created locally in real-time. This is because the processor unit 64 filters out all data that shares the color of the conveyor 12 or the color of the eggs 14. Thus, all that remains is the non-egg objects 16 or debris. The primary function of the processor unit 64 is to detect non-egg objects 16 or debris and prevent those objects from entering other parts of the production process. The processor unit 64 also identifies the foreign objects 16 in space and can predict in real-time where the object 16 will be later to trigger appropriate inspection events. The processor unit 64 also analyzes the captured image through different inspection levels and can create the necessary debris or shutoff signals depending on the application, and/or provide information to the operator of the equipment regarding objects 14, 16 in the captured images.

Once the processor unit 64 identifies a non-egg object 16 or debris, the processor unit 64 classifies the objects with colors other than the color of the conveyor and the color of the eggs as debris (collectively non-egg objects and debris referred hereinafter as debris 16). The processor unit 64 measures a size of the debris 16. The alarm signal is produced when measurements of the debris 16 exceed a predetermined value.

The processing unit 64 also images the debris 16 to create a debris image. The image of the debris 16 is then compared to a shape stored in a database. If the image of the debris 16 matches a shape in the database, the alarm signal is modified based on what type of debris 16 is identified. This is done because some debris 16 is more damaging to equipment downstream than other debris 16. A non-exhaustive list of objects that are in the image database include wrenches, screwdrivers, light bulbs, cell phones, body parts of chickens and the like. The alarm signal may also be modified if the debris 16 does not match an image stored in the database of the processing unit 64 but is measured to have a size greater than a predetermined value.

More specifically, a first inspection level detects all debris 16 on the conveyor 12 and triggers the audible alarm 66 and visual alarm 68 if debris 16 is detected. The processor unit 64 is programmed to ignore the different background noise beneath the eggs 14 on any of the types of conveyors 12 used, including for example seams of a conveyor belt. As stated above, the debris detection system 10 may include a backdrop that is installed below or within the conveyor 12 to help reduce the amount of extraneous colors that may be captured in the images.

A second inspection level uses a library of vision tools as known to those skilled in the art with customized input parameters. A preloaded database of colors is used to filter out the conveyor 12 and the eggs 14 from the image. The debris 16 will remain in the image. From there, the processor unit 64 filters out the conveyor 12 and the eggs 14, leaving only the debris 16. By focusing on areas other than the eggs 14, the processor unit 64 can operate much quicker than the systems that focus on the eggs 14 as well as the debris 16.

A third inspection level allows for image matching. The processor unit 64 matches debris 16 in the captured images to preset images stored in a preloaded database of known foreign objects. These objects are typical objects that can be found in egg production environment, such as conveyor parts, tools, poultry feeding equipment, light bulbs, poultry body parts, etc. In one embodiment, there are twenty (20) objects that the system will learn to identify. It should be appreciated by those skilled in the art that the system is not limited in how many objects it will be able to learn and identify.

Based on the inspection levels above, the audible 66 and visual 68 alarms may be activated, along with the shutoff switch 72 and speed control switch 74. Such events may be used independently or in tandem with the others depending on the requirements of the conveyor 12. The processor unit 64 identifies the position of the debris 16 and can predict, based on camera trigger events, where the foreign object 16 will be later to trigger appropriate inspection events. Inspection events can be triggered immediately or up to a user adjustable, pre-defined time delay. Such event designations may include: Event 1 triggers the audible alarm 66; Event 2 triggers the visual alarm 68; Event 3 triggers a reduction in the conveyor speed; Event 4 stops the conveyor 12; Event 5 triggers another machine on the line to perform a secondary function, such as egg spacer devices, dividers, reservoirs, washers, picking robotic arms, etc.; Event 6 sends the captured image electronically to another device in the form of an alert, such as cell phone app, notifications, text, etc.; and Event 7 can trigger a text based alert giving written explanation or instructions to the recipient for follow-up action.

Once the debris 16 has been removed from the conveyor 12, either manually or automatically, an acknowledgement signal must be sent to the processor unit 64 to continue normal operation. This acknowledgement signal can be sent manually via the reset button 70, which may be in the form of a push button, may be another personal electronic device, or may be sent automatically via a secondary vision inspection system.

A touch screen monitor 76 is connected to the processor unit 64 to interface with the operator and to display vision or captured images. The images aid the operator in identifying potential debris alarms. The monitor 72 is secured within the housing 44 above the front door 46 for interaction with the operator.

An external computer and keyboard 78 may be hard wired or wirelessly connected to the system 10 for additional image processing and image saving. The external computer 78 can monitor the camera's functionality as well as storing device for recording any failed images for further review. The computer 78 can be connected to the internet and/or intranet via Wi-Fi, ethernet, or modem for remote support and/or software updates.

Figure 5:
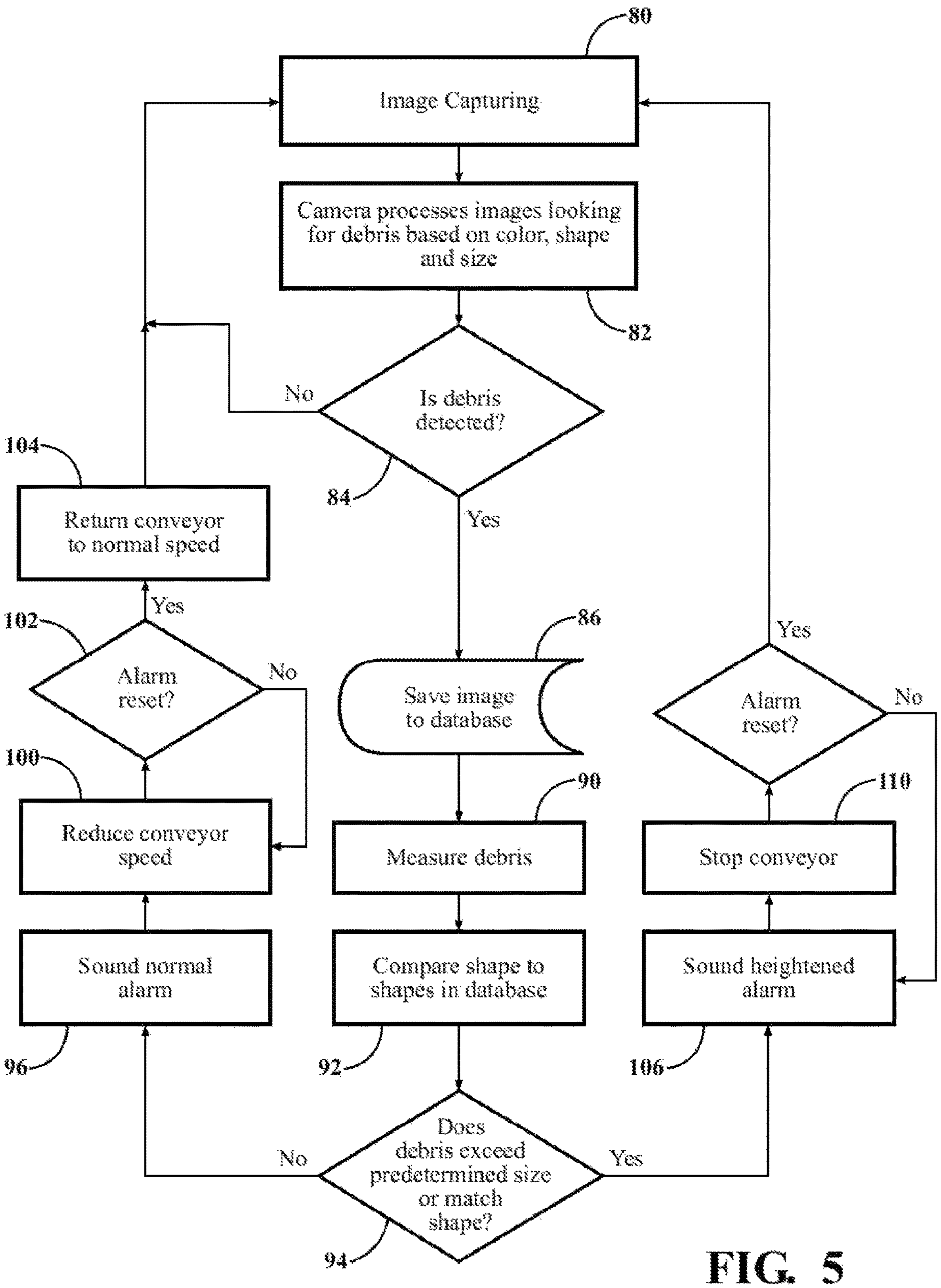
FIG. 5 illustrates a flow chart of the processor of the system.

FIG. 5 illustrates a simplified flowchart of the processing steps performed by the processor unit 64. The first step 80 shows the camera 60 being triggered in approximate 1 second intervals to capture an image. The processor unit 64 processes the image looking for foreign objects 16 based on color, shape, and size at step 82. If a foreign object 16 is not detected at step 84, the process loops back to step 80 to capture more images. If a foreign object 16 is detected at step 84, the image is saved to a database at step 86. The debris 16 is measured at 90. Then, the shape of the debris 16 is compared to shapes stored in the database at 92. It is then determined at 94 whether the debris 16 exceeds a predetermined size or matches a predefined shape.

Next, if the debris 16 does not exceed the predetermined size or match a predefined shape, a normal alarm signal is generated at 96. The speed of the conveyor 12 is reduced at 100. If the alarm is reset at 102, the conveyor 12 is returned to normal operating speed at 104 and the processing unit 64 continues to capture images at 80. If the alarm is not reset, the method loops back to step 100 and maintains a reduced speed for the conveyor 12 until the alarm is reset.

Returning to step 94, if the debris 16 detected is larger than a predetermined size or has the shape of a predefined shape, a heightened alarm is sounded at 106 (the alarm may also include lights of various wavelengths to provide a visual alarm as well). The conveyor 12 may be stopped at 110. When the alarm is reset, the method returns to step 80 and continues capturing images. If not, the heightened alarm is continued to be sounded at 106 until the matter is addressed through manual inspection and removal of the debris 16.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

The invention claimed is:

1. A method for detecting debris on a conveyor with a plurality of objects on the conveyor and being moved thereby, the method comprising the steps of:

imaging the conveyor as the conveyor moves the objects;

filtering out a color of the conveyor and a color of the objects from images created by imaging the conveyor;

detecting in the images a non-filtered out color;

classifying a shape and a size of the non-filtered color in the images;

determining based on at least one of the size and the shape of the non-filtered out color whether the non-filtered out color represents a debris requiring removal;

comparing the shape of the non-filtered out color to a plurality of debris shapes stored in a database and identifying the non-filtered out color as the debris if the shape of the non-filtered out color matches one of the debris shapes stored in the database, and if the at least one of the size and the shape of the non-filtered out color represents debris requiring removal, then initiating at least one of signaling to stop movement of the conveyor to allow for removal of the debris and an alarm signal.

2. The method as set forth in claim 1, wherein the objects are eggs.

3. A method for real-time detecting of foreign objects on a moving conveyor with a plurality of objects moving on the conveyor, the method comprising the steps of:

imaging the conveyor as the conveyor moves the objects, wherein a discrete image is continually produced, wherein by filtering out a color of the conveyor and a color of the objects substantially only foreign objects remain visible in the image;

classifying a shape and a size of the foreign objects in the image;

determining based on at least one of the size and the shape of the foreign object whether the foreign object requires removal by comparing the foreign object to a shape stored in a database and identifying the foreign object as debris when the foreign object matches one of the shapes stored in the database; and if the foreign object requires removal, then performing at least one of signaling to stop movement of the conveyor to allow for removal of the foreign object and initiating an alarm signal.

4. The method as set forth in claim 3, wherein the objects are eggs.

5. A method for detecting debris on a conveyor with a plurality of eggs on the conveyor and being moved thereby, the method comprising the steps of:

optically scanning the conveyor as the conveyor moves the eggs;

filtering out a color of the conveyer and a color of the eggs from images created by optically scanning the conveyor;

detecting colors other than the color of the conveyor and the color of the eggs;

classifying as debris any objects on the conveyor with colors other than the color of the conveyor and the color of the eggs;

imaging the debris to create a debris image;

comparing the debris image to a shape stored in a database;

identifying the debris when the debris matches one of the shapes stored in the database; and initiating at least one of signaling to stop movement of the conveyor to allow for removal of the debris and an alarm signal, and modifying the alarm signal based on the debris detected.

6. The method as set forth in claim 5, wherein the step of classifying the debris includes comparing the debris to images of commonly found debris including at least one of tools, screws, nuts, and chicken parts.

* * * * *